United States Patent [19]

Vobach

[11] Patent Number: 5,193,115
[45] Date of Patent: Mar. 9, 1993

[54] PSEUDO-RANDOM CHOICE CIPHER AND METHOD

[76] Inventor: Arnold R. Vobach, 11114 Ashcroft, Houston, Tex. 77096

[21] Appl. No.: 824,025

[22] Filed: Jan. 22, 1992

Related U.S. Application Data

[63] Continuation-in-part of Ser. No. 577,936, Sep. 5, 1990, Pat. No. 5,113,444.

[51] Int. Cl.$^5$ ............................................... H04L 9/02
[52] U.S. Cl. ....................................... 380/46; 380/48; 380/23
[58] Field of Search ........................ 380/23, 28, 36, 37, 380/44, 45, 46, 47, 48

[56] References Cited

U.S. PATENT DOCUMENTS

| | | |
|---|---|---|
| 2,949,501 | 8/1960 | Hell . |
| 3,067,280 | 12/1962 | Schlafly, Jr. . |
| 3,911,216 | 10/1975 | Bartek et al. . |
| 4,193,131 | 3/1980 | Lennon et al. . |
| 4,202,051 | 5/1980 | Davida et al. . |
| 4,206,315 | 6/1980 | Matyas et al. . |
| 4,301,327 | 11/1981 | Lee et al. . |
| 4,326,098 | 4/1982 | Bouricius et al. . |
| 4,341,925 | 7/1982 | Doland . |
| 4,369,434 | 1/1983 | Mueller . |
| 4,418,275 | 11/1983 | Oosterbaan et al. . |
| 4,441,095 | 4/1984 | Widmer et al. . |
| 4,638,120 | 1/1984 | Herve . |
| 4,667,301 | 5/1987 | Chiu et al. . |
| 4,776,011 | 10/1988 | Busby . |
| 4,791,669 | 12/1988 | Kage . |
| 4,853,962 | 8/1989 | Brockman . |
| 5,113,444 | 5/1992 | Vobach ................................ 380/47 |

OTHER PUBLICATIONS

"An Introduction to TRIARCH 2000," Jul., 1989, Rich Inc., pp. 2-30, 76 Beaver St., 14th Floor, New York, N.Y. 10005.

"TRIARCH 2000 Trading Information Architecture," 5 pages, data unknown, Rich Inc., A Reuter Co.

"Trading Room Systems," Product Information Brochure, Rich Inc., A Reuter Co., 4 pages, Data Unknown.

"Trading Information Systems Requirements An Overview," J. Nadan et al. IEEE Comm. Sec., New York Section Seminar, Dec. 4, 1986, pp. 1-12.

*Primary Examiner*—Tod Swann
*Attorney, Agent, or Firm*—Rosenblatt & Associates

[57] ABSTRACT

A cipher system is disclosed in which each character of a plaintext alphabet has associated with it a randomly distributed collection of integers of a given length. This collection of integers is secretly shared by a sender and receiver pair. The plaintext characters of a message are sequentially coded by pseudo-randomly selecting representatives from the integer collections corresponding to the plaintext characters. To this sequence of concatenated integers, regarded as a single integer, is added a pseudo-random integer of length equal to that of the coded-for-message integer string. This pseudo-random integer is generated by a pseudo-random number generator (The receiver has a corresponding generator.), the output of which is initialized by a "seed" integer concealed in the cryptogram. The summed pseudo-random integer plus the coding integer string is transmitted as the body of the cryptogram. To decrypt, the receiver subtracts the pseudo-random integer from the transmitted integer, breaks up the remaining integer into the blocks numerically coding the plaintext characters and retrieves the plaintext characters of the message. Provision is made for further obscuring the cryptogram integer.

24 Claims, 5 Drawing Sheets

PSEUDO-RANDOM CHOICE CIPHER AND METHOD

FIELD OF THE INVENTION

The present invention relates generally to a computing system and method. Specifically, the present invention relates to a cipher system and method for encrypting and decrypting computer information.

BACKGROUND OF THE INVENTION

A common method of encrypting a plaintext message starts by substituting integers for plaintext characters according to some standard alphabet such as ITA2, ITA5, ASCII, or EBCDIC. These integers are then written in binary form to create a first string, or sequence, of 0's and 1's. To the first string is modulo 2-added another, second sequence of 0's and 1's to produce still a third sequence of 0's and 1's. The third sequence of 0's and 1's is transmitted as the encrypted message. The sender's object if to make this third string of 0's and 1's appear to be a random sequence of digits in binary form the intended receiver modulo 2-adds the second sequence to the third sequence to recover the first sequence. Thereafter, the original plaintext message is derived from the standard alphabet that was used, e.g., ITA2, ITA5, ASCII, or EBCDIC. If the second sequence is truly random, an interceptor-attacker will be unable to reproduce the first sequence. Thus, the plaintext message is preserved.

There are a number of problems with this scheme: First, random number strings are a relatively scarce commodity. Second, the receiver must have at hand exactly the same random number sequence the sender used or must be able to reproduce it. Having at hand exactly the same random number sequence the sender used requires the sharing of an enormous amount of key material. The sharing of an enormous amount of key material is impractical. Reproducing exactly the same random number sequence the sender used is impossible.

To avoid these two difficulties, a pseudo-random number generator is commonly employed by both sender and receiver. A pseudo-random number generator is a deterministic machine which, when initialized by a "seed" number, produces a string of digits which appears to be random (by passing various statistical tests). The output of a pseudo-random number generator is periodic, but the period can be made very long. When sender and receiver use pseudo-random number generators to produce the second, key, or encrypting sequence, they start with a common initializing "seed" and synchronize the outputs of their generators. Starting with a common initializing "seed" and synchronizing the outputs of the generators allows a known-plaintext attack in which an interceptor-attacker gains access to plaintext (hence to its binary digit string equivalent in terms of some standard numerical alphabet) and to the corresponding ciphertext. Knowing the digits of the binary plaintext string enables the attacker to reproduce the corresponding pseudo-random number sequence. This frequently allows the attacker to determine the algorithm, initializing "seed," and output sequence of the system's pseudo-random number generator, thus "breaking" the code.

Gaining access to plaintext and to the corresponding ciphertext as described above, with its defects, is the intended use of the pseudo-random number generator described in U.S. Pat. No. 2,949,501. U.S. Pat. No. 3,911,216 reveals a well known non-linear shift register for the same purpose. Further, U.S. Pat. No. 4,202,051 describes linear shift register used with a non-linear function to generate a pseudo-random second sequence for use in the encrypting process as previously described.

U.S. Pat. No. 4,341,925 describes an encryption process in which the signals of two pseudo-random number generators are modulo 2-added, and then the resultant sum is modulo 2-added to a binary digitalized plaintext stream prior to transmission. One of the two original pseudo-random number sequences is multiplexed with the encrypted data stream and transmitted as a synchronizing signal. Modulo 2-adding the two pseudo-random sequences increases the period of the resultant sequence, and provision is made for sender-receiver synchronized changes in the two component streams sufficiently often to avoid revealing the period of their combined output. Since this is just an enhanced pseudo-random-number stream-modulo 2-added-to-the-plaintext scheme, it will be evident that it does not bear on the present invention.

U.S. Pat. No. 4,369,434 pertains to modification of existing proprietary encryption machines which require a secret primary code known to both sender and receiver, a transmitted synchronizing signal and a randomly generated auxiliary code which is transmitted in clear. The choice of initializing secret primary code is randomly made and its address, in a memory commonly held by sender and receiver, is transmitted in clear. The secret primary codes are functionally short and subsequently changed by a predetermined secret scheme.

The system described in U.S. Pat. No. 4,369,434 superficially resembles that of the present invention in that the starting address for the first secret primary code is transmitted, as is the initializing integer of the "masking tape" in the present invention. In the system described in U.S. Pat. No. 4,369,434, however, the primary codes must be changed if the message is lengthy. In the present invention, the masking tape simply continues to run for both sender and receiver. Further, the present invention requires neither transmission of a synchronizing signal nor transmission of an auxiliary code. In short, the encrypting-decrypting algorithm described in U.S. Pat. No. 4,369,434 is different from that of the present invention.

U.S. Pat. No. 4,638,120 describes a digitalized data encryption scheme in which a time-variable random number sequence, E, is generated by the sender and transmitted to the receiver. Sender and receiver share a secret code, S, and a set of identification codes, $I_n$, one of which is associated with each message M. To encrypt a message, the sender forms the concatenated binary sequence $EI_n$, call it $R_1$. An intermediate sequence, $S_1$, is formed by adding $R_1$ and S modulo 2, $S_1 = R_1 \oplus S$, where S is a secret code shared by sender receiver. Finally, an intrinsic code, R, is formed by ordinarily multiplication of the integers S, $S_1$ and $R_1$ and reducing the product modulo $(2^{64} - 1)$. $R = S \times S_1 \times R_1$ (mod $(2^{64} - 1)$). Since the address of $I_n$ is transmitted to the receiver, the receiver can reconstruct the intrinsic code R. The message, as a binary bit sequence, is added modulo 2 to the intrinsic key R in binary representation. The result is the message encryption. To decrypt, the binary sequence R is modulo 2-added to the transmission. For effective communication, sender and receiver share a secret code, S, and a commonly indexed set of message identification codes. Required to be transmitted are: the encrypted message, the time variable random (or pseudo-random) digit sequence, a synchronization signal and an address for the identification code. The process described in U.S. Pat. No. 4,638,120 has no material relationship with the encrypting-decrypting algorithm or shared information of the present invention.

U.S. Pat. No. 4,791,669 pertains to a method for error reduction in the encryption of a randomized digital encrypting string, Y, added modulo 2 to a digitalized plaintext stream. To shorten lengths of garbled portions of a ciphertext string, the message is broken into chunks or "frames" with a new construction of the sequence of binary encryption bits, Y, in each frame. To do this, bits from previous frames are used to call, randomly, out of memory sequences of bits for Y. Identical machinery and memories at the receiver likewise produce successive chunks of Y and permit decryption by modulo 2 addition of Y to the ciphertext stream. It should be remarked that complicating the construction of Y increases the probability that equipment error at either sender or receiver will degrade individual framed portions of the transmission. This may even increase message degradation overall. The randomizing of the encrypting string Y differs from that of the present invention in that it requires periodic reference to memories which contain stored integers at specific addresses instead of a memory which is simply a string of pseudo-randomly selected digits as in the present invention. Moreover, synchronizing signal transmissions are required in the system of the patent, but not in that of the present invention. Finally, and perhaps most importantly, the act of encryption as described in U.S. Pat. No. 4,791,669 involves the familiar addition modulo 2 of randomized bit string, Y, and digitalized, unencrypted plaintext. As remarked above, this invites known plaintext attacks.

The following four patents, although included for completeness, have no bearing on the present invention. U.S. Pat. No. 4,206,315 reveals a method of verifying signatures appended to a digitalized message transmission. The signing process requires transmission of successive compressed encodings of successive validation tables and the existence of an independent verifier. Specific cryptosystems are irrelevant except as they are required to fit into the construction of validation tables. Hence, there is no necessary connection between the art revealed in U.S. Pat. No. 4,206,315 and that of the present invention. U.S. Pat. No. 4,326,098 describes the use of a "vault," or verifying structure, through which users of terminals in a computer network exchange encrypted messages, thus providing for authentication by a neutral part of the network. Step coding and the Data Encryption Standard are employed for encryption, although, presumably, other cryptographic schemes could also be used. Since U.S. Pat. No. 4,326,098 does not reveal any new cryptosystems as such, it also does not suggest or disclose the present invention. U.S. Pat. No. 4,418,275 pertains to a method of and apparatus for having keys to a data file, as stated therein: "In computerized processing of data it is common practice to store like data items as multiple entries within a named data file." "A portion of each record, referred to as the kay, is used to reference a specific record." "Fundamental to the processing of the data file is the search for a data record associated with a specific key. A number of techniques have been developed which perform this specific function. A class of these techniques is referred to as hashing access methods." "A hashing access method is commonly used when the number of actual keys is a small percentage of the total number of possible keys." The scheme of U.S. Pat. No. 4,418,275 is claimed to be an improved hashing access method. U.S. Pat. No. 4,418,275 has nothing to do with data encryption or rendering stored data secure. Hence, it has nothing to do with the present invention. U.S. Pat. No. 4,667,301 involves a method of generating pseudo-random numbers. U.S. Pat. No. 4,667,301 has no connection with encryption-decryption of data (except as one might wish to employ this pseudo-random number generator); hence, it has no connection with the present invention.

SUMMARY OF THE INVENTION

To achieve the foregoing objects, features, and advantages and in accordance with the purpose of the invention as embodied and broadly described herein, a cipher system is provided comprising a plaintext alphabet each character of which is coded by a multiplicity of integers of a given length. The numerical synonyms of each of the plaintext characters are randomly distributed in the collection of all integers of length that of the numerical synonyms. Numerical synonyms corresponding to particular plaintext alphabet characters are selected pseudo-randomly from among the numerical synonyms associated with each such character. Wherein, the concatenation of numerical synonyms constitutes a plaintext message string integer, corresponding to a plaintext message. A string of consecutive digits comprising the output of a pseudo-random number generator is used to encrypt a plaintext message string integer whereby the string of consecutive digits is called a masking tape string. The initializing "seed" for the output of the pseudo-random number generator is concealed as a subset (possibly permuted) of the digits of an initializing integer to be transmitted with the encrypted message. The masking tape string integer is added to the right, with carries to the right, to the plaintext message string integer to form the ciphertext string integer. Pseudo-random integers of possibly variable length are prefixed, suffixed or interspersed among the digits of the ciphertext string according to prior arrangements between sender and receiver. Permutations are applied to the digits of successive blocks of digits of the ciphertext string. A leader integer coded to identify prefixes, suffixes, interspersions and block permutations is inserted into the transmitted digit string between the initializing integer and ciphertext message string. The initializing integer-ciphertext string is super-encrypted by addition to a second masking tape string identified by a second initializing integer.

BRIEF DESCRIPTION OF THE DRAWINGS

The accompanying drawings which are incorporated in and constitute a part of the specification, illustrate preferred embodiments of the invention and together with the general description of the invention given above and the detailed description of the preferred embodiments given below, serve to explain the principles of the invention.

Figure 1:
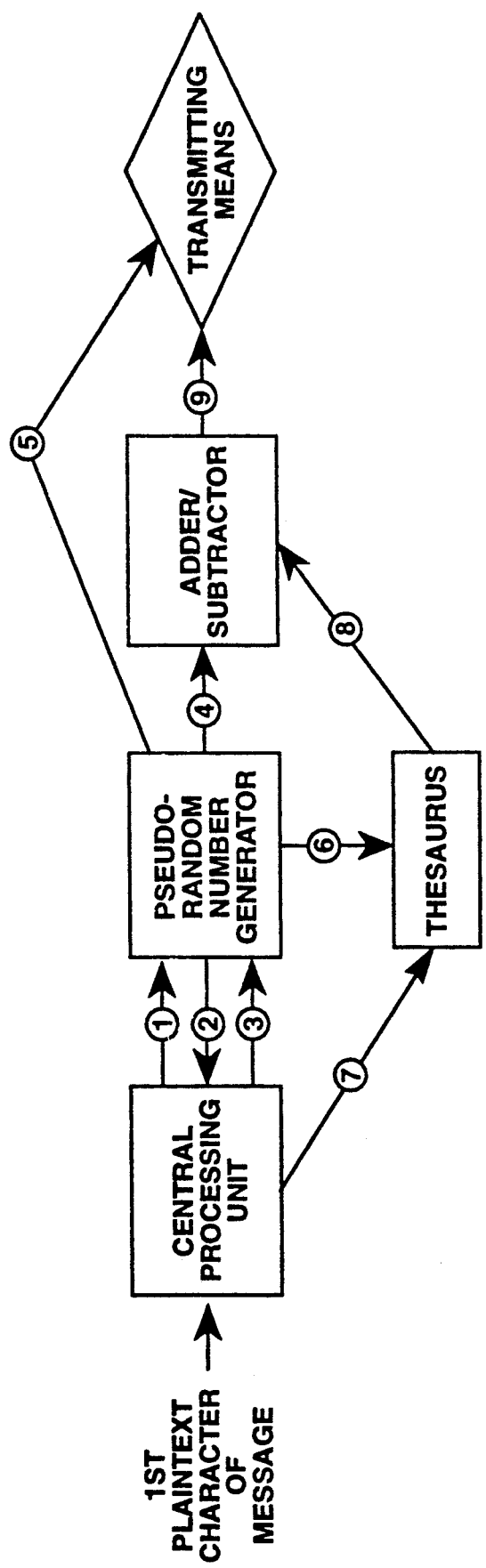
FIG. 1 is a flow chart illustrating a basic embodiment of the invention associated with the receipt of the first plaintext character to be transmitted using the present invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention. We now describe the invention and indicate how it avoids the problems associated with the common encryption method of adding, modulo 2, a pseudo-random bit string to a digitalized plaintext string.

First, a definition is provided of specific terms which are incorporated herein:

Digits are the first ten non-negative integers, 0, 1, . . . , 9. A pseudo-random integer is a finite sequence of pseudo-randomly selected digits. All integers are to be regarded as non-negative unless otherwise indicated. For an integer, n, $l_n$ is the number of digits making up n, i.e., the length of n.

A masking tape is a sequence of digits output by a pseudo-random number generator. The name "masking tape" is not purely facetious. A sequence of digits, serially accessed, may be regarded as and stored on a tape. The reference to "masking" will be apparent later.

A plaintext alphabet is a set of linguistic characters sufficient to generate to-be-encrypted message. It might consist of, say, the English alphabet, common words, digits, digraphs, acronyms and punctuation marks, for example. A plaintext alphabet might be represented by codes suitable for computer use, such as ASCII or EBCDIC.

A thesaurus, a dictionary of synonyms, is a many-to-one function, t, from the set of all integers, of common length, $l_y$ onto a plaintext alphabet, or onto a numerical coding for a plaintext alphabet.

It is desirable, first, to make the cardinality of the domain of the thesaurus function much larger than that of the range (plaintext alphabet—128 characters for ASCII and 256 characters for EBCDIC). This permits large cardinality pre-images of plaintext characters and makes the probability of randomly selecting a particular integer from the pre-image of a particular plaintext character small. Each integer in the domain of t is a numerical synonym for the plaintext character to which it is mapped.

Second, the cardinality of the pre-image of a range element of a thesaurus should, as a fraction of the cardinality of the domain of the thesaurus, as nearly as possible, approximate the relative frequency of that range element in the plaintext language of encrypted messages. The desired result of course is that the number of numerical synonyms for a plaintext character is proportional to the frequency of its use in transmitted messages, providing greater ambiguity in the ciphertext for frequently used plaintext characters.

The result of these two requirements is that the probability of the use of any given numerical synonym is very small, and that the individual probabilities of use of any two numerical synonyms (representing the same or different plaintext characters) are nearly equal.

Further, each pre-image set of each plaintext character is to be randomly distributed among the set of integers of length $l_y$ $10^{l_t}$ in number. That is, the probability that an integer of length $l_t$ is in $t^{-1}(p_8)$, for each $p_i$ in the plaintext alphabet is the cardinality of $t^{-1}(p_i)$ divided by $10^{l_t}$, card $t^{-1}(p_i))/10^{l_t}$.

The encryption of a message consisting of a sequence of plaintext characters of length m, $p_1, \ldots, p_m$, begins as follows: For the first character, $p_1$, pseudo-randomly select an element of $t^{-1}(p_1)$. Henceforth abusing notation, since $t^{-1}(p_1)$ is, as used above, always really a set of integers, call the selected integer $t^{-1}(p_l)$. It is a numerical synonym of $p_l$. Successively repeat the process for each of $p_2$ through $p_m$. Concatenating the $t^{-1}(p_i)$'S, in order gives us a plaintext message string of digits of length m•$l_t$. This selection of numerical synonyms for plaintext characters is by itself, a homophonic substitution cipher.

To encrypt the plaintext message string, the sender selects an initializing "seed" integer to start the output of a pseudo-random number generator. The sender reads out the output digits of the pseudo-random number generator to a total of m•$l_t$.

Call this retrieved digit string, the masking tape string.

Now the sender adds the plaintext message string (an integer) to the masking tape string (also an integer). Addition starts with the left most, or most significant, digit of each (instead of the least significant, or right most, digit of each). Addition is to the right (instead of to the left) with carries to the right (instead of to the left). This "backwards" addition permits decryption of the message in the order in which the cipher synonyms appear in the plaintext message string. The sum of the plaintext message string and the masking tape string is the ciphertext string.

The initializing "seed" for the output of the pseudo-random number generator is concealed in a prearranged (known to sender and receiver) way in an initializing integer. The "seed" may in fact be a prearranged permutation of a prearranged subset of a pseudo-randomly chosen initializing integer. The initializing integer followed by the ciphertext string is then transmitted to the receiver. The receiver retrieves the initializing "seed" from the initializing integer, supplies it to a pseudo-random number generator identical to that of the sender and recreates the sender's making tape string. Subtracting this "backwards" or to the right from the ciphertext string, gives the plaintext message string of digits in successive blocks, $t^{-1}(p_i)$, of length $l_t$. Finding the successive images in the thesaurus, $t(t^{-1}(p_i))=p_i$, yields the string of plaintext characters which constituted the original message.

Consider now the advantages of the present system, in its simplest form as described above, over the summation of a pseudo-random sequence of digits and a stream of integers corresponding one-for-one to the characters of a plaintext alphabet. First, since the masking tape string only appears to an eavesdropper as a summand of the known ciphertext string, reconstructing it depends upon knowing the plaintext message string. Since, for a given encrypted message, there will be many equally probably possible plaintext message strings, there will be as many equally probable possible masking tape strings. In short, the plaintext message string "masks" the masking tape string.

Conversely, the masking tape string conceals the choices of the numerical synonyms in the plaintext message string, since each of many equally probably masking tape strings is associated with a corresponding plaintext message string. The masking tape string "masks" the plaintext message string. This latter function is the only masking commonly employed.

To confuse attackers about the length of the message, sender and receiver can conceal the beginning and ending of the actual ciphertext string by the use of prefix and suffix pseudo-random integers, of agreed-upon length, transmitted preceding and following the actual ciphertext string. This might be done in such a way as to keep the transmitted digit string from having length a multiple of $l_t$.

Further to confuse an attacker about the true nature of the ciphertext string, sender and receiver might also adulterate the ciphertext string by using interspersed pseudo-random integers not necessarily of length $l_y$ between selected pairs of numerical synonyms in the plaintext message string. Placement of the integers might be varied, from message to message, by successive selections from a list, by some function of the initializing integer or by some function of a prefix pseudo-random integer. Knowing the algorithm for selecting the insertion schemes, the receiver, but not an attacker, would be able to edit them out of transmitted and received messages.

A ciphertext string with prefixed or suffixed pseudo-random integers or with interspersed pseudo-random integers is an adulterated ciphertext string.

What has been described so far is a stream cipher in which the ciphertext string of digits decrypts to the plaintext message. There is nothing to prevent permutations of successive blocks of digits (or of zeros and ones for digits in binary form), followed by transmission of the string of permuted blocks. These blocks may be of fixed or variable length as long as they, and the order of their application, are known to both sender and receiver. They may be obtained by cycling through a list known to sender and receiver or obtained as a function of the initializing integer. A (an adulterated) ciphertext string subjected to block permutations prior to transmission is a purmuted (adulterated) ciphertext string.

The receiver, knowing which succession of permutations has been applied, knows which succession of inverse permutations to apply, restoring the ciphertext string. Using permutations of digit blocks of length greater than $l_t$ will intermingle digits arising from different numerical synonyms, further confusing attackers.

Naturally, the last permutation of ciphertext digits may require adding digits to the transmission. Determining how many digits are extraneous after the sequence of inverse permutations has been applied is solved by having the sender "sign" the message by sending an encrypted signature (one of many supposedly known only to the receiver-sender pair). When the receiver comes to the end of the decrypted signature or pass code, he regards all subsequent digits as extraneous and ignores them.

In order that a ciphertext string not end in a sequence of zeros, thus limiting the number of ways in which it can be decomposed into a masking tape string and a plaintext message string, extraneous digits other than zero may be added at the end of the ciphertext string and recognized by the receiver as such as indicated above. If the ciphertext string is a permuted (or permuted and adulterated) ciphertext string, this may not be necessary.

In the invention disclosed in application Ser. No. 07/577,936, now U.S. Pat. No. 5,113,444, of which the present invention is a further development, an extensive masking tape of random digits was used to generate masking tape strings. In situations in which it is impractical to share a very long collection of random digits, sender and receiver may employ the method of the present invention, sharing, instead, identical pseudo-random number generators to generate the masking tape string. This is cone by concealing, for each message, the initializing "seed" integer, which determines the common output of the generators, in an initializing integer which replaces the starting integer of the system as previously described in the parent invention. For example, if the initializing seed integer were concealed as an agreed-upon permutation of ten digits, it could be any one of approximately $10^{14}$ possibilities in a 30-digit initializing integer. ($_{30}P_{10} > 1.09 \times 10^{14}$.)

Changing the initializing seed with each message would slow down known plaintext attacks. Still, a known plaintext attack might ultimately succeed were it not for a second unique feature of the present invention: The plaintext message string integer, consisting as it does of a sequence of randomly occurring integer codings of plaintext message characters, "masks" the masking tape out of the pseudo-random number generators.

The initializing integer may serve other functions as well, namely, determining prefixed, suffixed and interspersed integers as well as block permutations of digits.

Additionally, an initializing integer could contain numerically coded instructions for altering the numerical synonym output of the thesaurus in at least two ways: first, by permuting the digits of the numerical synonym selected for each plaintext alphabet character, and second, by shifting each numerical synonym by a common fixed added integer (modulo the value of the numerically largest numerical synonym). Undoing the digit permutations and removing the added "shift" would be accomplished by the receiving unit based upon instructions contained in the initializing integer. These functions, sending and receiving, could be handled in the central processing units of FIGS. 1-5, as described below.

The use of memory cards ("IC cards"), which store programs and data on computer chips, suggests an authentication scheme, which is suitable for securing access to confidential computer networks and their storage files: A memory card stores the processor's account number, a brief masking tape and the algorithm for computing the function value, $f(x_1, \ldots, x_n)$, for some function of n digits, $x_1, \ldots, x_n$, possibly utilized in blocks. For example, the $x_1, \ldots, x_n$ might be divided into blocks, all but the last of which provide the absolute values of the coefficients of a polynomial form, while the last provides the value of the variable of the polynomial. A verifier or "guardian" of the information stores each of these short masking tape and functional algorithm pairs, indexed by users' account numbers.

When a memory card is presented to the memory car reader—a simple computer linked to the verifier computer—for entry to the system, the verifier calls up the masking tape and algorithm corresponding to the card's account number and generates a pseudo-random starting integer which is sent to the memory card reader. The starting integer locates a string, $d_1, \ldots, d_n$, of n consecutive digits in the masking tape of the memory card, which the memory card reader uses to calculate $f(d_1, \ldots, d_n)$ from the card's stored algorithm. This number, $f(d_1, \ldots, d_n)$ is transmitted back to the verifier, which has made the same calculation based on the value of the starting integer. If the two function values agree, the possessor of the memory card, is free to enter into the system.

According to an Associated Press release of Sep. 14, 1991, as reported in the Houston Chronicle, memory cards with four megabytes of capacity will be available by the end of 1991, and it is expected that they will have a capacity of 40 megabytes in four years.

FIG. 1 is a flow chart illustrating a basic embodiment of the invention associated with the receipt of the first plaintext character to be transmitted using the present invention. The first plaintext character of a message to be encrypted is input to the Central Processing Unit, the CPU. The CPU activates the Pseudo-Random Number Generator, PRNG, via a link 1. The PRNG generates the initializing integer for the message which it transmits to the CPU via a link 2. The CPU stores the initializing integer for the duration of the message and extracts an initializing "seed" from the initializing integer which it transmits back to the PRNG via a link 3. The PRNG takes the initializing "seed" and uses it to generate a pseudo-random string of digits of length $l_t$ for submission via a link 4 to the Adder/Subtracter. The initializing integer is also transmitted via a link 5 to the Transmitting Means (radio transmitter, wire link, etc.) and is transmitted as the first digit substring of the cryptogram.

The CPU via the link 1 next causes the PRNG to send a pseudo-random integer to the Thesaurus via a link 6. The Thesaurus, in a natural embodiment, looks up the first numerical synonym greater (or lesser or nearest) than the pseudo-random integer, input via the link 6, which corresponds to the numerically coded first plaintext character input from a link 7. It sends this numerical synonym via a link 8 to the Adder/Subtracter. The Adder/Subtracter adds the first numerical synonym to the first masking tape substring of length $l_t$ and sends it off for transmission via a link 9 to the Transmitting Means, following the initializing integer.

Figure 2:
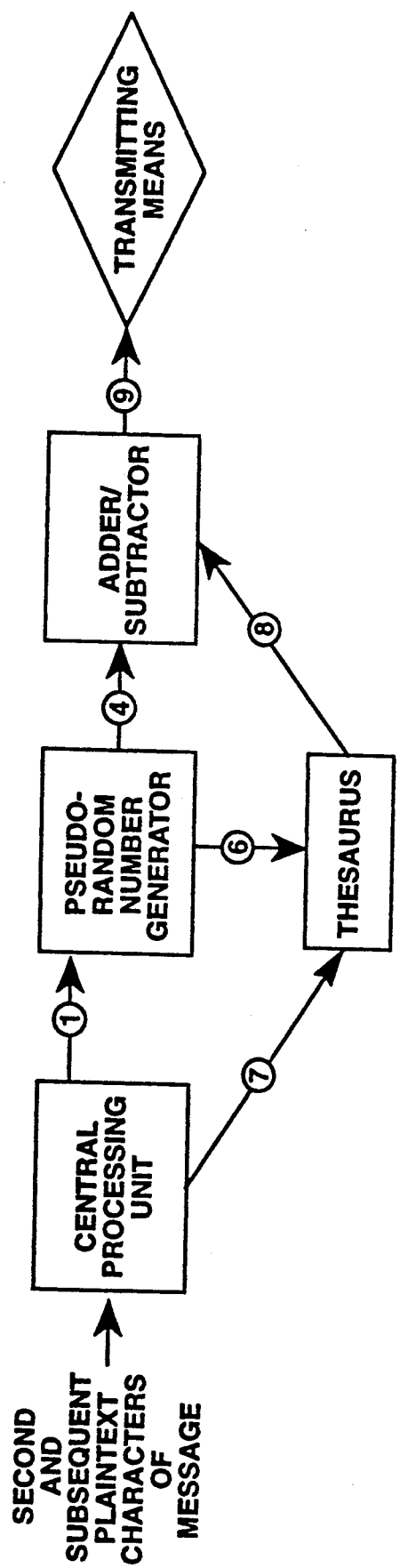
FIG. 2 is a flow chart illustrating a basic embodiment of the invention associated with receipt of a second and subsequent plaintext characters to be transmitted.

FIG. 2 is a flow chart illustrating a basic embodiment of the invention associated with receipt of a second and subsequent plaintext characters to be transmitted. In FIG. 2, the second plaintext message character is converted to a numerical equivalent in the CPU and this integer is sent via the link 7 to the Thesaurus. The CPU also instructs the PRNG to produce its next succeeding masking tape substring of length $l_t$ and to transmit it via the link 4 to the Adder/Subtracter. Meanwhile, again via the link 1, the CPU has also instructed the PRNG via the link 6 to send another pseudo-randomly integer to the Thesaurus.

As with the first plaintext character, the Thesaurus takes the second pseudo-random integer and looks up the first numerical synonym greater (or lesser, etc.) than this pseudo-random integer, which numerical synonym corresponds to the second plaintext character of the message, This numerical synonym goes, via the link 8, to the Adder/Subtracter where it is added to the corresponding, second, piece of masking tape. Provision is made of course for any carryover from the first such sum for the first plaintext character. This second summation then also goes off, via the link 9, for transmission as part of the ciphertext string.

Third and subsequent plaintext characters are handled correspondingly until the completed cryptogram has been transmitted.

Figure 3:
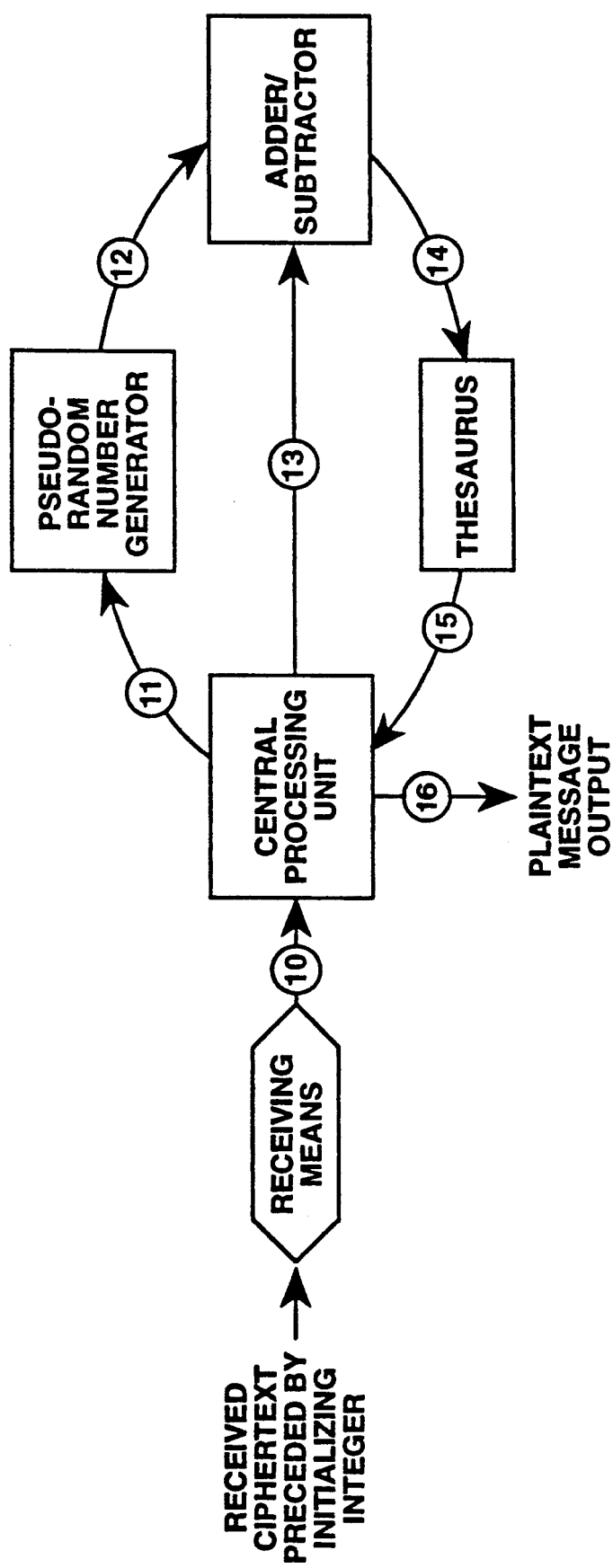
FIG. 3 is a flow chart illustrating a basic embodiment of the invention associated with the reception and decryption of the encoded message.

FIG. 3 is a flow chart illustrating a basic embodiment of the invention associated with the reception and decryption of the encoded message. Upon receipt of the initializing integer of a cryptogram from the Receiving Means (radio receiver, etc.) via a link 10, the CPU communicates via a link 11 to the PRNG, identical to the one used by the sender, the value of the initializing "seed" extracted from the initializing integer. The PRNG then starts generating the sequence of masking tape digits used by the sender. These are sent via the link 12 to the Adder/Subtracter.

The Adder/Subtracter receives the ciphertext string (minus the initializing integer) from the CPU via a link 13, subtracts the masking tape string supplied by the PRNG and sends the resulting sequence of numerical synonyms via a link 14 to the Thesaurus.

The Thesaurus sequentially looks up the numerically coded equivalents of the plaintext message characters and sends these via a link 15 to the CPU. The CPU converts the integer codings to plaintext characters and sends via a link 16 the plaintext message out to e.g., a printer.

Figure 4:
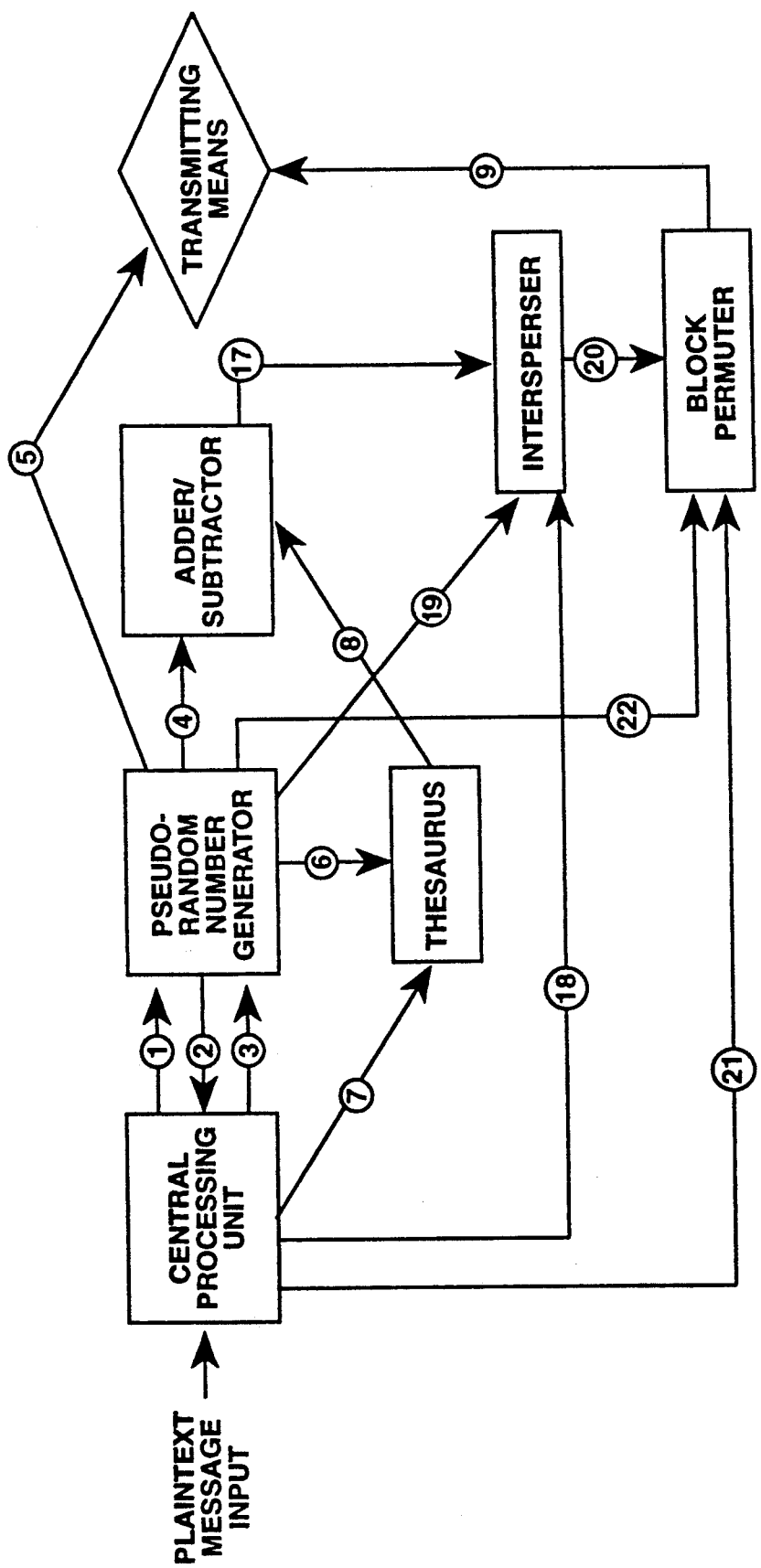
FIG. 4 is a flow chart illustrating a preferred embodiment of the invention in which the initializing integer initiates adulteration and permutation of the ciphertext string.

FIG. 4 is a flow chart illustrating a preferred embodiment of the invention in which the initializing integer initiates adulteration and permutation of the ciphertext string. A preferred embodiment as illustrated in FIG. 4 is basically identical to that described with reference to FIGS. 1 and 2. However, in this embodiment, provision is made for the transmission of an adulterated (by prefix, suffix and interspersed pseudo-random integer) and permuted (by permutations of blocks of digits) ciphertext string. In this embodiment, the initializing integer is used to select places for and lengths of interspersed pseudo-random integers and the choice of the sequence of integer block permutations. These two initializing integer-based selection processes must, of course, be shared by sender and receiver, most readily perhaps, in their respective CPU's.

In this embodiment, an Intersperser receives the initial ciphertext stream via a link 17 from the Adder/Subtracter. The ciphertext string is interrupted by the Intersperser by instructions from the CPU carried by a link 18. The gaps are filled by pseudo-random integers received via a link 19 from the PRNG. The CPU instructs the PRNG, via the link 1, to send these pseudo-random integers to the Intersperser.

From the Intersperser via a link 20 the adulterated ciphertext string is conveyed to the Block Permuter where a sequence of digit-block permutations is applied to successive blocks of ciphertext digits upon instructions by the CPU conveyed to the Block Permuter via the link 21.

The CPU, having kept track of the length of the adulterated ciphertext string, instructs the PRNG via the link 1 to send, via a link 22, sufficient pseudo-random digits to permit the application of the last indicated block permutation.

Finally, the adulterated permuted ciphertext string falls in behind the initializing integer and is sent, via the link 9, to the Transmission Means for transmission to a receiver.

Figure 5:
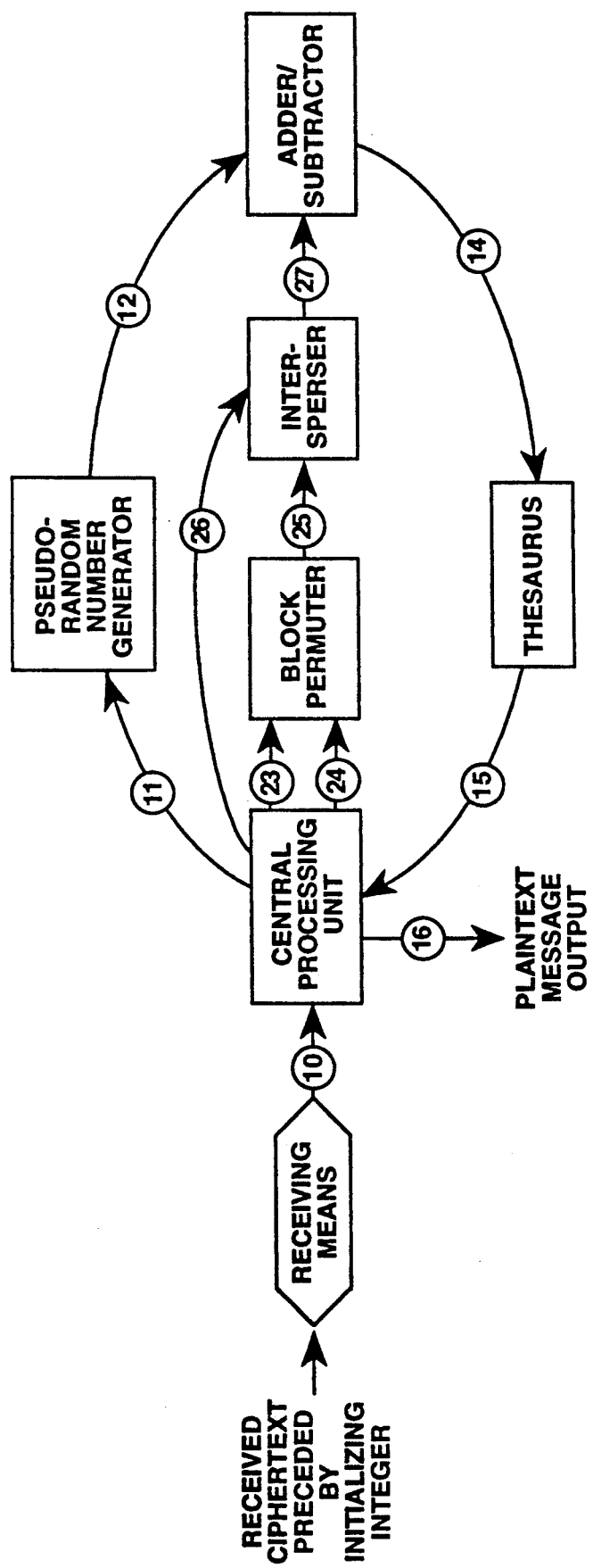
FIG. 5 is a flow chart illustrating a preferred embodiment of the invention in which the initializing integer initiates the undoing of permutations and the removal of adulterations from the ciphertext string.

FIG. 5 is a flow chart illustrating a preferred embodiment of the invention in which the initializing integer initiates the undoing of permutations and the removal of adulterations from the ciphertext string. The reception-decrypting process of this preferred embodiment is identical to that of FIG. 3, except that further provision must be made for unscrambling the permuted digit blocks and removing the adulterating integers before the ciphertext is fed to the Adder/Subtracter.

Upon receiving the cryptogram, beginning with the initializing integer, from the Receiving Means via the link 10, the CPU transmits the adulterated permuted ciphertext string via a link 23 to the Block Permuter. Using the initializing integer, the CPU sends instructions by a link 24 to the Block Permuter, causing ti to apply the inverses of the sequence of digit-block permutations to the received ciphertext string. The result is the unpermuted, but still adulterated, ciphertext string which is sent via a link 25 to the Intersperser to delete the prefixed, suffixed and interspersed random integers. By link a 26, the CPU instructs the Intersperser to delete the prefixed, suffixed and interspersed random integers. The now unadulterated, unpermuted ciphertext string is conveyed by a link 27 to the Adder/Subtracter.

The CPU sends the initializing "seed" by the link 11 to the PRNG and initiates the transmission of the masking tape string to the Adder/Subtracter by the link 12. The Adder/Subtracter subtracts the masking tape string from the ciphertext string, revealing the plaintext message string.

The plaintext message string goes by the link 14 to the Thesaurus where the sequence of numerical synonyms is converted to a sequence of integers numerically coding the sequence of plaintext alphabet characters. This is sent by the link 15 to the CPU for conversion to the original plaintext message, which is output by the link 16.

A simple way of further encrypting a permuted and/or adulterated ciphertext string would be to add another masking tape string to the permuted, adulterated ciphertext string prior to transmission—using, of course, a second initializing integer.

I claim:

1. A cipher system for use by a sender and a receiver to generate cryptograms, the system comprising:
   (a) a plaintext alphabet, each character of which is coded by a collection of numerical synonyms comprising non-negative integers of a common fixed length such that:
      (i) the fraction, of all the numerical synonyms, for all the plaintext alphabet characters, corresponding to a given plaintext alphabet character is substantially equal to the relative frequency of use of that plaintext alphabet character in constructing meaningful plaintext messages;
      (ii) the numerical synonyms for each plaintext alphabet character are randomly distributed in the collection of all non-negative integers, in their natural ordering, which have the common fixed length of the numerical synonyms; and
      (iii) the choice of a numerical synonym to represent a plaintext alphabet character is pseudo-randomly made from the collection of numerical synonyms corresponding to that plaintext alphabet character;
   (b) a concatenation of the numerical synonyms comprising a plaintext message string integer corresponding to a plaintext message; and
   (c) a masking tape string comprising a pseudo-random sequence of digits, generated by an initializing seed, a new initializing seed for each cryptogram and the initializing seed concealed as a subset of the digits of an initializing integer, and added to the plaintext message string to form a ciphertext string.

2. A cipher system for cryptographic use, as defined in claim 1, in which the initializing seed for generating the pseudo-random sequence of digits is concealed in an initializing integer transmitted with the encrypted message.

3. A cipher system for cryptographic use, as defined in claim 2, in which the initializing integer is coded to identify prefixes, suffixes, interspersions and block permutations in the ciphertext message string.

4. A cipher system for cryptographic use, as defined in claim 2, in which the initializing integer is coded to identify permutations of digits of numerical synonyms and additions of a common fixed integer to the numerical synonyms of a plaintext message string integer.

5. A cipher system for cryptographic use, as defined in claim 1, in which a leader integer, coded to identify prefixes, suffixes, interspersions and block permutations, is inserted into the transmitted digit string between the initializing integer and the ciphertext message string.

6. A cipher system for cryptographic use, as defined in claim 1, in which the masking tape string integer is added to the right, with carries to the right, to the plaintext message string integer to form the ciphertext string integer.

7. A cipher system for cryptographic use, as defined in claim 1, in which pseudo-random integers, of possibly variable length, are prefixed, suffixed or interspersed among the digits of the ciphertext string according to prior arrangements between sender and receiver.

8. A cipher system for cryptographic use, as defined in claim 1, in which permutations are applied to the digits of successive blocks of digits of the ciphertext string.

9. A cipher system for cryptographic use, as defined in claim 1, in which a leader integer, coded to identify prefixes, suffixes, interspersions and block permutations, is inserted into the transmitted digit string between the initializing integer and the ciphertext message string.

10. A cipher system for cryptographic use, as defined in claim 1, in which the initializing integer-ciphertext string is superencrypted by addition to a second masking tape string identified by a second initializing integer.

11. A cipher system for cryptographic use, as defined in claim 1, in which a memory card containing a user number, a masking tape and functional algorithm is used to gain accesses to a secure network.

12. A cipher system for cryptographic use, as defined in claim 1, in which a memory card containing a user number, a pseudo-random number generator and a functional algorithm is used to gain access to a secure network.

13. A cryptographic method for generating cryptograms comprising the steps of:
   (a) generating a plaintext alphabet each character of which is coded by a collection of numerical synonyms comprising non-negative integers of a common fixed length such that:

(i) the fraction, of all the numerical synonyms, for all the plaintext alphabet characters, corresponding to a given plaintext alphabet character is substantially equal to the relative frequency of use of that plaintext alphabet character in constructing meaningful plaintext messages;

(ii) the numerical synonyms for each plaintext alphabet character are randomly distributed in the collection of all non-negative integers, in their natural ordering, which have the common fixed length of the numerical synonyms; and (iii) the choice of a numerical synonym to represent a plaintext alphabet character is pseudo-randomly made from the collection of numerical synonyms corresponding to that plaintext alphabet character;

(b) concatenating the numerical synonyms, comprising a plaintext message string integer corresponding to a plaintext message; and (c) forming a masking tape string, comprising a pseudo-random sequence of digits, generated by an initializing seed, a new initializing seed for each cryptogram and the initializing seed concealed as a subset of the digits of an initializing integer, and added to the plaintext message string to form a ciphertext string.

14. A cryptographic method, as defined in claim 13, in which the initializing seed for generating the pseudo-random sequence of digits is concealed in an initializing integer transmitted with the encrypted message.

15. A cryptographic method, as defined in claim 14, in which the initializing integer is coded to identify prefixes, suffixes, interspersions and block permutations in the ciphertext message string.

16. A cryptographic method, as defined in claim 14, in which the initializing integer is coded to identify permutations of digits of numerical synonyms and additions of a common fixed integer to the numerical synonyms of a plaintext message string integer.

17. A cryptographic method, as defined in claim 13, in which a leader integer, coded to identify prefixes, suffixes, interspersions, and block permutations, is inserted into the transmitted digit string between the initializing integer and the ciphertext message string.

18. A cryptographic method, as defined in claim 13, in which the masking tape string integer is added to the right, with carries to the right, to the plaintext message string integer to form the ciphertext string integer.

19. A cryptographic method, as defined in claim 13, in which pseudo-random integers, of possibly variable length, are prefixed, suffixed or interspersed among the digits of the ciphertext string according to prior arrangements between sender and receiver.

20. A cryptographic method, as defined in claim 13, in which permutations are applied to the digits of successive blocks of digits of the ciphertext string.

21. A cryptographic method, as defined in claim 13, in which a leader integer, coded to identify prefixes, suffixes, interspersions, and block permutations, is inserted into the transmitted digit string between the starting integer and the ciphertext message string.

22. A cryptographic method, as defined in claim 13, in which the initializing integer-ciphertext string is superencrypted by addition to a second masking tape string identified by a second initializing integer.

23. A cryptographic method, as defined in claim 13, in which a memory card containing a user number, a masking tape and a functional algorithm is sued to gain access to a secure network.

24. A cryptographic method, as defined in claim 13, in which a memory card containing a user number, a pseudo-random number generator and a functional algorithm is used to gain access to a secure network.

* * * * *